US012206572B2

(12) United States Patent
Gandhi et al.

(10) Patent No.: US 12,206,572 B2
(45) Date of Patent: *Jan. 21, 2025

(54) PERFORMANCE MEASUREMENT, TELEMETRY, AND OAM IN MPLS NETWORKS USING ENTROPY LABELS

(71) Applicant: Cisco Technology, Inc., San Jose, CA (US)

(72) Inventors: Rakesh Gandhi, Stittsville (CA); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/372,587

(22) Filed: Sep. 25, 2023

(65) Prior Publication Data

US 2024/0022500 A1  Jan. 18, 2024

Related U.S. Application Data

(63) Continuation of application No. 17/565,823, filed on Dec. 30, 2021, now Pat. No. 11,799,757.

(Continued)

(51) Int. Cl.
*H04L 45/12* (2022.01)
*H04L 43/0852* (2022.01)
(Continued)

(52) U.S. Cl.
CPC ........ *H04L 45/123* (2013.01); *H04L 43/0852* (2013.01); *H04L 45/50* (2013.01); *H04L 12/4633* (2013.01)

(58) Field of Classification Search
CPC ............. H04L 12/4633; H04L 43/0852; H04L 45/123; H04L 45/50
See application file for complete search history.

(56) References Cited

U.S. PATENT DOCUMENTS

2011/0019569 A1  1/2011  Venkateswaran et al.
2013/0121164 A1  5/2013  Shabtay et al.
(Continued)

FOREIGN PATENT DOCUMENTS

WO  WO2019155144 A1  8/2019
WO  WO2021047321 A1  3/2021

OTHER PUBLICATIONS

Gandhi, R., et al., "MPLS Data Plane Encapsulation for In-situ OAM Data," MPLS Working Group, Cisco Systems, Inc., Jul. 12, 2021, 7 pages.

(Continued)

*Primary Examiner* — Mohamed A. Wasel
(74) *Attorney, Agent, or Firm* — Lee & Hayes, P.C.

(57) ABSTRACT

Techniques for utilizing entropy labels of a Multiprotocol Label Switching (MPLS) label stack for performing monitoring operations (e.g., telemetry, performance measurement, OAM, etc.) without altering the MPLS label stack and/or packet path (e.g., ECMP path). The techniques may include determining, by a node of a network, to perform a monitoring operation associated with traffic that is to be sent along a path through the network. In some examples, the node may receive a packet that is to be sent along the path and encapsulate the packet with an MPLS header. The MPLS header may include an entropy label, entropy label indicator, or other label that is capable of carrying a flag indicating the monitoring operation to be performed. The flag may be carried in a TTL field or traffic class field of the label such that the MPLS label stack is not altered to trigger the monitoring operation.

20 Claims, 10 Drawing Sheets

Related U.S. Application Data

(60) Provisional application No. 63/237,656, filed on Aug. 27, 2021, provisional application No. 63/227,446, filed on Jul. 30, 2021.

(51) Int. Cl.
*H04L 45/50* (2022.01)
*H04L 12/46* (2006.01)

(56) References Cited

U.S. PATENT DOCUMENTS

| | | |
|---|---|---|
| 2015/0003458 A1 | 1/2015 | Li et al. |
| 2015/0229552 A1 | 8/2015 | Saltsidis |
| 2017/0366461 A1 | 12/2017 | Wu et al. |
| 2021/0176170 A1 | 6/2021 | Decraene |
| 2021/0218669 A1 | 7/2021 | Xu |
| 2022/0014453 A1 | 1/2022 | Mirsky |
| 2022/0166722 A1 | 5/2022 | Dave et al. |
| 2023/0031423 A1 | 2/2023 | Gandhi |

OTHER PUBLICATIONS

Office Action for U.S. Appl. No. 17/565,823, mailed on Mar. 7, 2023, Rakesh Gandhi, "Performance Measurement, Telemetry, and OAM in MPLS Networks Using Entropy Labels".

PCT Search Report and Written Opinion mailed Sep. 21, 2022 for PCT application No. PCT/US2022/036924, 14 pages.

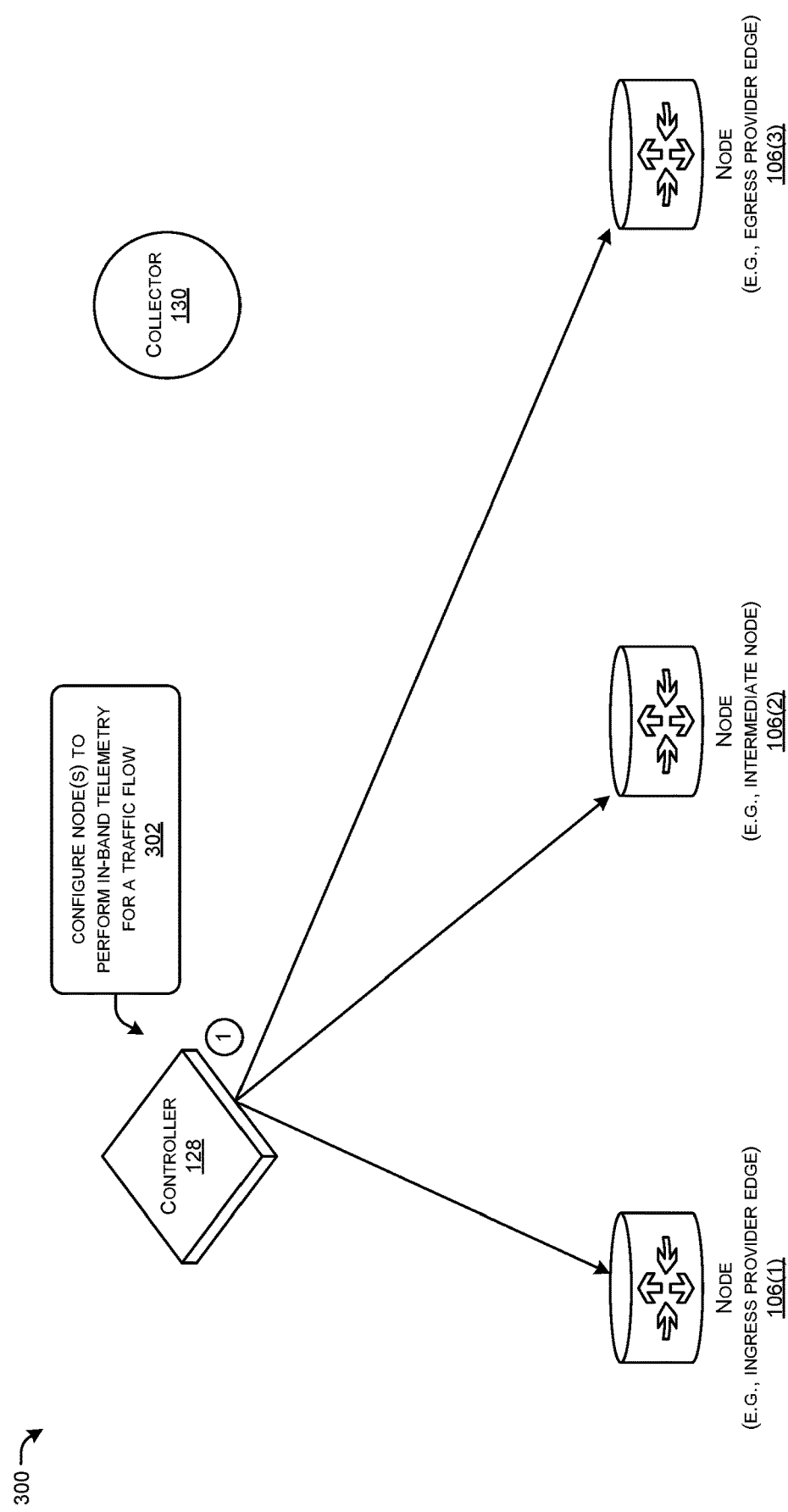

LABEL STACK 600

| TRANSPORT LABEL(S) 112 | TC 122 | TTL 124 |
|---|---|---|
| ACCOUNTING LABEL(S) 114 | TC 122 | TTL 124 |
| ENTROPY LABEL INDICATOR 116 | TC 122 | TTL 124 |
| TS-LOC 608 | STRUCTURED EL 118 | FLAG(S) 126 |
| LIFETIME (E.G., DEADLINE TIMESTAMP) 504 | TIMESTAMP FORMAT 610 | |
| LIFETIME (E.G., DEADLINE TIMESTAMP) 504 | TIMESTAMP FORMAT 610 | |
| PAYLOAD 120 | | |

LABEL STACK 602

| TRANSPORT LABEL(S) 112 | TC 122 | TTL 124 |
|---|---|---|
| ACCOUNTING LABEL(S) 114 | TC 122 | TTL 124 |
| ENTROPY LABEL INDICATOR 116 | TC 122 | TTL 124 |
| STRUCTURED ENTROPY LABEL 118 | FLAG(S) 126 | |
| VPN LABEL 612 | TC 122 | TTL 124 |
| IOAM DATA FIELD(S) 614 | | |
| PAYLOAD 120 | | |

LABEL STACK 604

| TRANSPORT LABEL(S) 112 | TC 122 | TTL 124 |
|---|---|---|
| ACCOUNTING LABEL(S) 114 | TC 122 | TTL 124 |
| ENTROPY LABEL INDICATOR 116 | TC 122 | TTL 124 |
| TS-LOC 608 | STRUCTURED EL 118 | TC 122 | FLAG(S) 126 |
| PAYLOAD 120 | | |
| TIMESTAMP(S) 616 | | |

LABEL STACK 606

| TRANSPORT LABEL(S) 112 | TC 122 | TTL 124 |
|---|---|---|
| ACCOUNTING LABEL(S) 114 | TC 122 | TTL 124 |
| ENTROPY LABEL INDICATOR 116 | TC 122 | TTL 124 |
| SLID 208 | STRUCTURED EL 118 | TC 122 | FLAG(S) 126 |
| TS-LOC 608 | TC 122 | TTL 124 |
| PAYLOAD 120 | | |
| TIMESTAMP(S) 616 | | |

```
┌─────────────────────────────────────────────┐
│ DETERMINE, BY A FIRST NODE OF A NETWORK,    │
│ TO PERFORM A MONITORING OPERATION           │
│ ASSOCIATED WITH TRAFFIC THAT IS SENT ALONG  │
│ AN ECMP PATH BETWEEN THE FIRST NODE AND A   │
│ SECOND NODE OF THE NETWORK                  │
│ 702                                         │
└─────────────────────────────────────────────┘
                     │
                     ▼
┌─────────────────────────────────────────────┐
│ RECEIVE, AT THE FIRST NODE, A PACKET THAT   │
│ IS TO BE SENT ALONG THE ECMP PATH TO THE    │
│ SECOND NODE                                 │
│ 704                                         │
└─────────────────────────────────────────────┘
                     │
                     ▼
┌─────────────────────────────────────────────┐
│ ENCAPSULATE, BY THE FIRST NODE, THE PACKET  │
│ WITH A MULTIPROTOCOL LABEL SWITCHING (MPLS) │
│ HEADER THAT INCLUDES AN ENTROPY LABEL, THE  │
│ ENTROPY LABEL INCLUDING A FLAG INDICATING   │
│ THE MONITORING OPERATION TO BE PERFORMED    │
│ 706                                         │
└─────────────────────────────────────────────┘
                     │
                     ▼
┌─────────────────────────────────────────────┐
│ SEND, BY THE FIRST NODE, THE PACKET         │
│ INCLUDING THE MPLS HEADER ALONG THE ECMP    │
│ PATH TO THE SECOND NODE                     │
│ 708                                         │
└─────────────────────────────────────────────┘
```

PERFORMANCE MEASUREMENT, TELEMETRY, AND OAM IN MPLS NETWORKS USING ENTROPY LABELS

RELATED APPLICATIONS

This application is a continuation of and claims priority to U.S. patent application Ser. No. 17/565,823, filed Dec. 30, 2021, which claims priority to U.S. Provisional Patent Application No. 63/237,656, filed Aug. 27, 2021, and to U.S. Provisional Patent Application No. 63/227,446, filed Jul. 30, 2021. The entire contents of each of the above referenced Applications are incorporated herein by reference in their entirety and for all purposes.

TECHNICAL FIELD

The present disclosure relates generally to techniques for, among other things, utilizing an entropy label of an MPLS header of a packet for performing telemetry, in-band performance measurement, and Operations, Administration, and Maintenance (OAM) without altering the MPLS label stack.

BACKGROUND

In order to trigger certain operations in Multiprotocol Label Switching (MPLS) networks, the MPLS label stack of a packet is typically altered. For instance, to measure packet loss of data-plane traffic, an ingress node of the MPLS network needs to color the data-plane traffic. However, existing techniques to color the data-plane traffic in MPLS networks suffer from Equal-Cost Multipath (ECMP) flip flop issues as the MPLS label stack can change periodically to toggle the color, thereby changing the ECMP path of a packet. Similarly, in order to trigger other operations, such as telemetry actions, OAM, or the like, the MPLS label stack may need to be altered, causing the same ECMP path hashing issue.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 3A and 3B collectively illustrate an example process in which nodes send telemetry data based on a packet including a flag indicating a telemetry operation.

FIG. 6 illustrates example MPLS label stacks that can be used for performing various monitoring operations.

FIG. 7 is a flow diagram illustrating an example method associated with carrying indicator flags within an entropy label of an MPLS label stack.

DESCRIPTION OF EXAMPLE EMBODIMENTS

Overview

Figure 1:
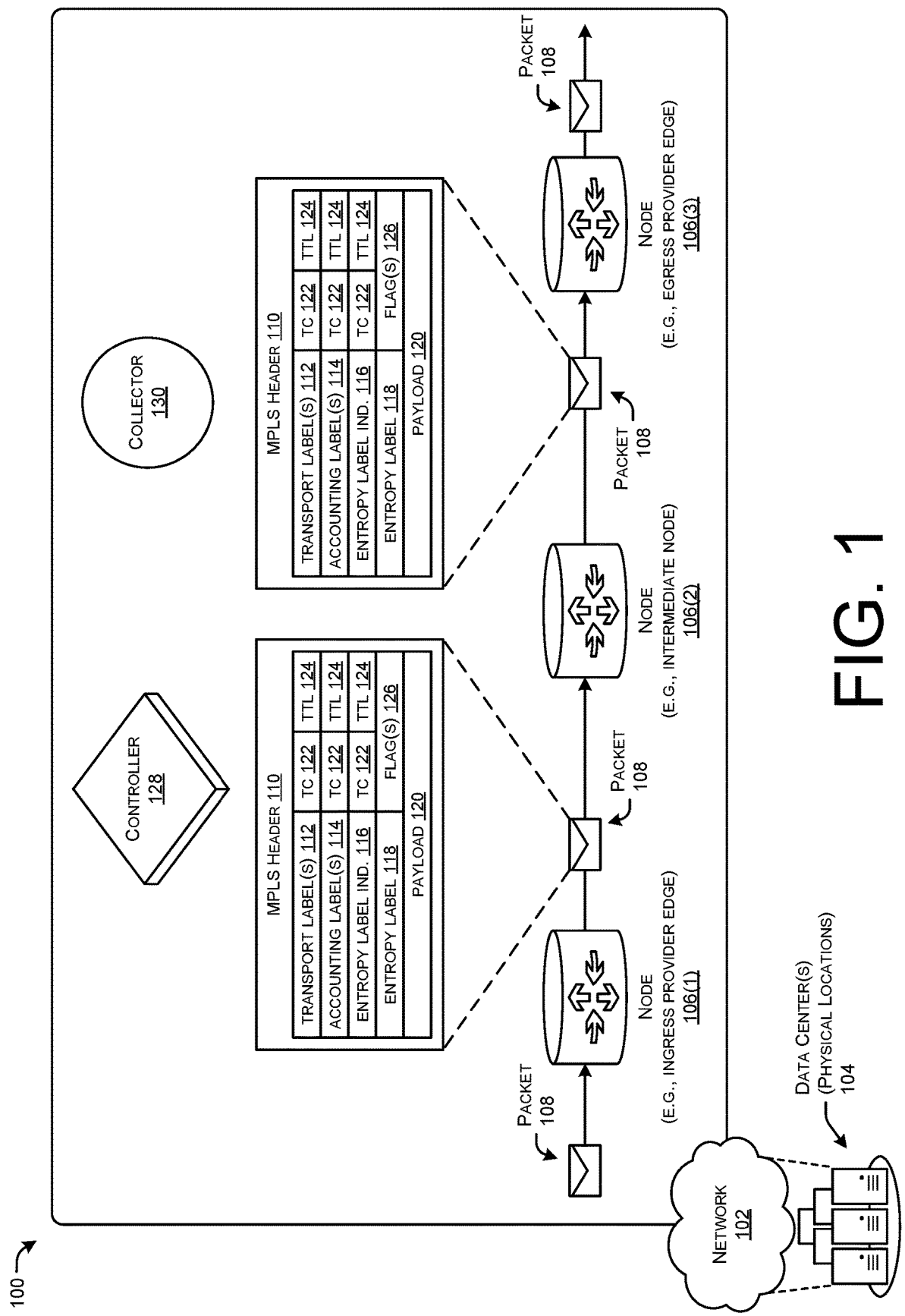
FIG. 1 is a system-architecture diagram illustrating an example architecture that may perform various aspects of the techniques described herein.

This disclosure describes various technologies associated with utilizing an entropy label of an MPLS label stack for performing telemetry, in-band performance measurement, and OAM operations without altering the MPLS label stack such that a packet path is changed. By way of example, and not limitation, a method according to the technologies described herein may include receiving a packet that is to be sent along an equal-cost multipath (ECMP) route. The method may also include encapsulating the packet with a Multiprotocol Label Switching (MPLS) header that includes a special purpose label. In some examples, based at least in part on a determination that a monitoring operation is to be performed, the special purpose label of the MPLS header may be altered to include an indication of the monitoring operation to be performed. The method may also include sending the packet including the MPLS header along the ECMP route.

Additionally, the techniques described herein may be performed as a method and/or by a system having non-transitory computer-readable media storing computer-executable instructions that, when executed by one or more processors, performs the techniques described above.

Example Embodiments

As discussed above, in order to trigger certain operations (e.g., telemetry, performance measurement, OAM, etc.) in MPLS networks, the MPLS label stack of a packet may need to be altered. For instance, to measure packet loss of data-plane traffic, an ingress node of the MPLS network needs to color the data-plane traffic. However, existing techniques to color the data-plane traffic in MPLS networks suffer from ECMP flip flop issues as the MPLS label stack can change periodically to toggle the color, thereby changing the ECMP path of a packet. Additionally, other operations can suffer from similar ECMP flip flop issues.

This disclosure describes techniques for utilizing an entropy label of an MPLS label stack for performing monitoring operations, such as telemetry, in-band performance measurement, OAM, etc. without altering the MPLS label stack and/or altering a path of the packet. For instance, a field (e.g., time to live (TTL) field, traffic class (TC) field, entropy label field, etc.) of the MPLS Entropy Label may be used to carry one or multiple flags associated with performing a monitoring operation (e.g., in-band telemetry, OAM, performance measurement, packet loss, latency measurement, timestamp updating, time synchronization, time-sensitive networking (TSN) operations, in-situ OAM (IOAM) operations, or the like). The techniques described herein for utilizing the entropy label to carry the indicator flags are backwards compatible and can be deployed in existing networks (e.g., segment routing (SR) networks, EVPN networks, etc.) without altering the ECMP behavior of a node.

Various advantages can be realized by utilizing the techniques described herein. For instance, the techniques make it possible to get the same ECMP behavior for data flows. In other words, rather than altering the MPLS label stack and sending a packet along a different path, the MPLS label stack is not altered, and the packet is sent along its usual path. Additionally, the techniques are backwards compatible on intermediate nodes and can be deployed in existing networks without the existing nodes dropping the packets with zero or non-zero TTL since the intermediate nodes may ignore the TTL field of the entropy label. Further, the techniques work seamlessly with other use-cases (e.g., network slicing), do not affect the maximum label stack depth, and work for all MPLS networks including segment routing and EVPN. The techniques also provide advantages when using the entropy label TTL/TC field(s) for in-band telemetry by only requiring a single bit in an existing standard (entropy label) compared to 3 extra labels (e.g., extension indicator label (15), new indicator label, new flow label) proposed in other solutions those along with entropy label require 5 labels to be added in the MPLS header. That is, the entropy label itself is used as a flow identifier and does not require the defining of a new label.

By way of example, and not limitation, a method according to the various technologies described herein may include, in some examples, determining, by a first node of a network, to perform a monitoring operation associated with customer traffic that is sent along a path between the first node and a second node of the network. In some examples, the network may be an MPLS network, SR network, EVPN network, or another type of network. In some examples, the first node may be an ingress provider edge node (e.g., an SR-MPLS Policy node) of the network, the second node may be an egress provider edge node of the network, and the path between the ingress provider edge node and the egress provider edge node may include one or more additional nodes (e.g., intermediate nodes) of the network. In other examples, the first node and/or the second node may be any node of the network that is capable of adding encapsulation to a packet, such as an edge node, intermediate node, or the like.

In some examples, the first node may receive a packet that is to be sent along the path to the second node, and based at least in part on determining to perform the monitoring operation, the first node may encapsulate the packet with an MPLS header that includes an entropy label. In some examples, the entropy label may include a flag indicating the monitoring operation that is to be performed. For instance, and as discussed in further detail below, the monitoring operation may comprise, or be associated with, a packet loss measurement, a telemetry operation, an OAM operation, a determination of a latency between the first node and the second node, a determination of whether a TSN lifetime has expired, an IOAM operation, or the like. Additionally, in some examples, the flag may be included in at least one of a TTL field, traffic class field, entropy label control field, or other field of the entropy label of the MPLS header (e.g., MPLS stack).

In this way, the first node may send the packet including the MPLS header along the path to the second node. Based at least in part on including the flag in the entropy label of the MPLS header, the MPLS stack is not altered and the packet may be sent along the path to the second node instead of being sent along a different path that is not usually traversed by packets of the customer traffic. In some examples, a controller associated with the network may configured one or more nodes of the network, such as the first node and the second node, to perform the monitoring operations.

As noted above, in some examples, the flag may indicate that the monitoring operation to be performed is a packet loss performance measurement associated with the traffic sent along the path between the first node and the second node. Additionally, in some examples, a bit included in the entropy label may be flipped to indicate a first coloring associated with the packet of the traffic, the first coloring being distinguishable from a second coloring associated with another packet of the traffic. For instance, the first node (e.g., ingress node) may, periodically, toggle a bit in the TTL or Traffic Class field of the entropy label to color the data traffic. In some examples, the location of the bit flag can be provisioned on the first node and/or second node by a controller of the network. In this way, the TX packets on the first node (e.g., ingress node) and the RX packets on the second node (e.g., egress node) may be counted, in some examples, using an ACL (Access Control List) that may also include the color in the TTL (or TC) field. In such examples, any intermediate nodes along the path may refrain from removing the entropy label indicator (ELI) and the entropy label (EL) from the MPLS header. That is, it may be important for the egress node to receive the ELI and EL in the MPLS header. In some examples, the controller may collect the TX counter using EDT (Event Driven Telemetry) from the first node for the frozen (in-active) color and then trigger the MDT (Model Driven Telemetry) on the second node to collect the RX counter for the traffic engineering SR policy for the same color. In some examples, a change in color may be used as a trigger to aggregate and compute performance metrics and/or generate telemetry on a node. In some instances, the telemetry data may contain delay and/or variance metrics for the last active color and traffic packet/byte counters. Additionally, or alternatively, TWAMP or STAMP-like probe messages may be used to collect traffic counters. In some examples, the flag to trigger the telemetry operation can be carried in the entropy label TTL or TC, the ELI TTL or TC, or in a special purpose label TTL or TC to be defined.

Using the MPLS entropy label TTL or TC field for packet coloring can offer several advantages. For instance, compared to using different accounting labels, the color in the ELI and/or EL does not affect the ECMP path taken by the traffic flow and does not cause traffic to ping pong on different ECMP paths when color changes. Additionally, using the MPLS entropy label TTL or TC field for packet coloring may have the benefit of halving the number of labels to be allocated for SR Policies on an egress node, as well as halving the Forwarding Information Base (FIB) scale for the number of forwarding entries to be installed in hardware. The change of color flag in the packet is also used to compute and aggregate the various performance metrics for the previous color such as computing minimum or maximum latency or jitter over the period when previous color traffic was received.

In some examples, the flag may indicate that the monitoring operation to be performed comprises a telemetry operation and the flag may indicate that the telemetry operation is to be performed. For instance, each node of the network that receives the packet (e.g., the first node, the second node, etc.) may determine that the packet includes the flag and, in some instances, generate a copy of the packet and send (e.g., punt) the copy of the packet to at least one of a controller or a collector associated with the network. In some examples, the path (e.g., flow) may be identified by the entropy value carried in the 20-bit Entropy Label field. Additionally, when in-band telemetry is enabled, the first node (e.g., ingress node) may, periodically, set the flag in the TTL or TC field of the MPLS entropy label to sample the data traffic. The location of the bit flag may, in some examples, be provisioned on the nodes (e.g. by the controller) of the network. In examples, nodes that support in-band telemetry using this scheme may make a copy of the data packet when the flag is set and trigger telemetry to the collector to send the data. In some examples, a copy of the packet may first be punted to a slow path for this purpose, and the node may forward a copy of the packet downstream in the fast path. In some examples, the in-band telemetry flag may also be used as a trigger to compute performance metrics and/or generate telemetry (e.g., delay metrics, variance metrics, traffic packet/byte counters, etc.). In some of these examples, it may be important that any intermediate nodes do not remove the ELI and EL from the MPLS header, as it may be necessary for the egress node to receive the ELI and EL in the MPLS header to allow the collection of samples of data along the path of the traffic flow. In some examples, the first node (e.g., ingress node, encapsulating node, etc.) may set telemetry flag at set intervals, such as once every 1 million packets, once every 30 seconds, or the like. In some examples, the probe packets may carry more than one EL (Entropy Label) in the MPLS header label stack. For instance, a midpoint node may copy the TTL and TC field from the received EL/ELI to the new EL/ELI when inserting the new EL/ELI in the MPLS header label stack. In some instances, a midpoint node may scan the entire label stack to find the monitoring flags if more than one EL/ELI set is present in the label stack. In some cases, the intermediate nodes must not remove the ELI/EL carrying the flags such that egress node receives them to be able to provide edge-to-edge monitoring. In some examples, the ingress node may add the ELI/ELI labels such that they do not get removed from the MPLS header along the path.

Using the MPLS entropy label TTL or TC field for triggering in-band telemetry can offer several advantages. For instance, this technique may require only a single bit in an existing standard (e.g., as opposed to adding multiple extra labels) since the entropy label itself is used as a flow identifier and does not require to define a new label. Additionally, because the same MPLS stack is used for in-band telemetry, the ECMP behavior of the node is not altered and, as a result, the packet traverses its usual path. In some examples, a new flow-identifier may be computed from the received packet header and sent along with the in-band telemetry or entire header of the packet may also be sent to provide the context to the controller. This is also the reason to not carry a separate flow identifier in the packet for telemetry.

In some examples, the flag may indicate that the monitoring operation to be performed is an Operations, Administration, and Maintenance (OAM) operation. For instance, when the second node receives the packet from the first node, the second node may make a determination that the packet includes the OAM-related flag and punt the packet to a control plane node associated with the network. In this way, the control plane node may perform the OAM operation. In some examples, the OAM-related flag included in the entropy label may cause the second node to punt, to the control-lane node or the slow-path (e.g., out of the fast forwarding path), the packet with an RX timestamp and an indication of the incoming interface of the second node. In some examples, the location of the bit flag can be provisioned on the nodes using the controller. In examples, the control-plane node or the slow-path node may process the punted packet, perform the OAM operation(s) and inject the packet back (e.g., to the second node, to a third node, to the fast-path, etc.) to forward the packet downstream. For instance, the SR-MPLS header may contain the label stack for the entire path, so the packet can be re-injected to reach it's intended destination. In some examples, the collected OAM information can be used for latency and/or packet loss use-cases, including both hop-by-hop or edge-to-edge cases. In some examples, packets may optionally carry IOAM data fields.

In various examples, the flag may indicate that the monitoring operation to be performed is to determine a latency associated with sending the packet along the path from the first node to the second node (e.g., hop by hop, end to end, etc.). For instance, the flag may indicate that the second node is to insert/update a timestamp (e.g., RX timestamp) at a specific location in the packet. In some examples, the location of the timestamp (e.g., 32-bit, 64-bit, etc.) may also be carried either in the TS-LOC field of the entropy label, TTL field, TC field or in a new field in a separate label following the entropy label. In some instances, additional flags and/or fields in the entropy label may identify the timestamp format, such as PTP, NTP, 32-bit, 64-bit, or the like. In examples, the second node (e.g., edge node) that pops the entropy label and recognizes the timestamp flag may update the timestamp at the location specified in TS-LOC or at the user-configured location in hardware fast forwarding path (without punting the packet to slow-path or control-plane) and forward the packet to the next-hop. This may achieve a higher scale for PM packets/sessions and a faster failure detection interval. In examples, the collected timestamp may then be used to measure edge-to-edge latency of the packet in the network. Another flag can also be defined to insert/update the interface or node IP address in addition to the timestamp at a specified location in the received packet.

In examples, the flag may indicate that the monitoring operation to be performed comprises determining whether a Time-Sensitive Network (TSN) lifetime has expired, and the TSN lifetime may be included in the packet. For instance, the flag included in the packet (e.g., in the TTL or TC of the entropy label, ELI, SPL, or the like) may indicate that the label stack has a timestamp which indicates the lifetime (i.e., deadline) of the data packets in the TSN. In some instances, the flag in the entropy label or the timestamp TTL may indicate 32-bit, 64-bit, or user-defined timestamp format. In examples, the first node (e.g., ingress node, encapsulation node, etc.) may insert the timestamp in the packet based on how much maximum delay the packet (and the service it belongs to) can experience in the network before the packet (and service it belongs to) is considered not usable. The timestamp itself may, in some examples, be carried in the label stack or after the label stack (BOS) in metadata (before the payload). In examples, each node that recognizes the TSN flag may check the timestamp in the packet with the local clock and, if the time in the packet has elapsed, the packet may be discarded; otherwise the packet may be forwarded to the next hop if the time has not elapsed. Additionally, or alternatively, when a lifetime/deadline expires, the node that detected the expiration of the lifetime may send telemetry data associated with the packet to the controller or collector of the network. In this way, the controller and/or the first node, upon detecting the failure, may take an action of switching traffic to another path in the network that can meet the required TSN service level agreement.

In some examples, the flag may indicate that the monitoring operation to be performed comprises an IOAM operation. For instance, the second node may receive the packet, make a determination that the packet includes the flag, and record OAM-related data (e.g., 32-bit or 64-bit timestamps, interface IP addresses, node IP addresses, interface packet counters, etc.) within the MPLS header of the packet or elsewhere in the packet. In some examples, the flag may indicate a preference and need for hop-by-hop IOAM processing or for edge-to-edge IOAM processing.

In some examples, multiple different flags may be defined for the different monitoring operations. For instance, one or more flags may be defined that are specific to packet loss performance measurement use cases, one or more flags may be defined that are specific to OAM operations, one or more flags may be defined that are specific to telemetry operations, and so forth. By way of example, and not limitation, the flags that may be defined for the specific examples described herein may include a "C" flag indicating a color of the traffic flow indicator (which may be one or more bits), an "E" flag indicating that an edge to edge IOAM Data field is present after the bottom of the label stack, an "H" flag indicating that a hop-by-hop IOAM data field is present after the bottom of the label stack or hop-by-hop processing is required, an "L" flag indicating that a TSN lifetime timestamp is present in the label stack, a "T" flag indicating that the second node is to timestamp the packet at a location specified in the EL field and forward the packet in fast forwarding path (and not punt to slow path), an "I" flag indicating to perform an in-band telemetry action (e.g., punt a copy of the packet and/or forward a copy), an "O" flag indicating an OAM operation to be performed (e.g., punt the packet with receive timestamp and incoming interface and re-inject it back in the fast forwarding path to fast forward it downstream), etc. In addition, a flag "R" may be defined to replicate the received packet to all next-hops outgoing ECMP paths on a node to be able to monitor and measure all such ECMP paths. In some examples, the flags may be carried in a TTL field or TC field of the entropy label (EL), structured entropy label (SEL), entropy label indicator (ELI), or other label of the MPLS label stack.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 is a system-architecture diagram illustrating an example architecture 100 that may perform various aspects of the techniques described herein. The network 102 may represent an MPLS network, a segment routing network, an EVPN network, or the like. In examples, the network 102 and the devices associated with the network 102 may be located within one or more data center(s) 104. The one or more data center(s) 104 may be physical facilities or buildings located across geographic areas that are designated to store computing resources. The data center(s) 104 may include various networking devices, as well as redundant or backup components and infrastructure for power supply, data communication connections, environmental controls, internet-of-things devices, services, and various security devices. In some examples, the data center(s) 104 may include one or more virtual data centers which are a pool or collection of cloud infrastructure resources specifically designed for enterprise needs, and/or for cloud-based service provider needs. Generally, the data center(s) 104 (physical and/or virtual) may provide basic resources such as processor (CPU), memory (RAM), storage (disk), networking (bandwidth), security, and the like. However, in some examples the devices of the network 102 may not be located in explicitly defined data center(s) 104 but may be located in other locations or buildings.

The network 102 may include one or multiple network nodes, such as the nodes 106(1), 106(2), and 106(3) (hereinafter referred to collectively as "nodes 106"), which may route packets, such as the packet 108, through the network 102. In some examples, the nodes 106 may be routers, switches, servers, or other physical and/or virtual computing devices. In some examples, the nodes 106 may be configured to serve as an edge node, such as an ingress provider edge node or an egress provider edge node. Additionally, some of the nodes 106 may be configured to serve as intermediate nodes that route traffic between edge nodes of the network.

In some examples, when the node 106(1) receives the packet 108, the node 106(1) may be configured to encapsulate the packet with an MPLS header 110 that includes an MPLS label stack. The label stack of the MPLS header 110 may include one or more transport label(s) 112, one or more accounting label(s) 114, an entropy label indicator (ELI) 116, an entropy label (EL) 118, and a payload 120. Additionally, each label of the label stack of the MPLS header 110 may include a corresponding traffic class (TC) field 122 and a corresponding time-to-live (TTL) field 124. However, as described herein the TC field 122 and/or the TTL field 124 of the entropy label 118 may be used to carry one or more flag(s) 126 indicating a monitoring operation that is to be performed with respect to the packet 108 and/or a packet path that the packet 108 is traversing through the network 102. Additionally, or alternatively, the one or more flag(s) 126 may be carried within the TC field 122 and/or the TTL field 124 of the entropy label indicator 116.

In some examples, when the node 106(2) receives the packet 108, the node 106(2) may be configured such that it does not remove the entropy label indicator 116 and/or the entropy label 118 from the label stack of the MPLS header 110 of the packet 108. In this way, downstream nodes, such as the node 106(3), may be able to determine whether a monitoring operation is to be performed upon receiving the packet 108. In some examples, the nodes 106(2) and 106(3) may each perform one or more monitoring operations upon receipt of the packet 108 depending upon which flag(s) 126 may be included in the packet 108. For instance, the one or more flag(s) 126 that may be included in the TC field 122 and/or the TTL field 124 of the entropy label 118 or the entropy label indicator 116 may include, for example, a flag indicating a color of the traffic flow indicator (which may be one or more bits), a flag indicating that an edge to edge IOAM Data field is present after the bottom of the label stack, a flag indicating that a hop-by-hop IOAM data field is present after the bottom of the label stack, a flag indicating that a TSN lifetime timestamp is present in the label stack, a flag indicating that the second node is to timestamp the packet at a location specified in the EL field and forward the packet, a flag indicating to perform an in-band telemetry action (e.g., punt a copy of the packet and/or forward a copy), a flag indicating an OAM operation to be performed (e.g., punt the packet with receive timestamp and incoming interface), and/or the like.

By including the one or more flag(s) 126 in the TC field 122 and/or the TTL field 124 of the entropy label 118 or the entropy label indicator 116 of the label stack of the MPLS header 110 of the packet 108, any ECMP behavior of the nodes 106 may not be altered when a monitoring operation is to be performed. That is, rather than including a new label in the label stack to indicate the monitoring operation to be performed, which would alter the packet path of the packet 108, the TC field 122 and/or the TTL field 124 may be used to carry this information.

In some examples, the network 102 may include a controller 128 and a collector 130. The controller 128 may, in some examples, configure the nodes 106 to perform the monitoring operations. For instance, the controller 128 may send to one or more of the nodes 106, an indication of a monitoring operation that is to be performed with respect to a certain data flow (e.g., packet path) of the network 102. In some examples, the collector 130 may collect information associated with the monitoring operations from the nodes 106, such as telemetry data, OAM data, performance data or the like. The collector 130 may, in some examples, aggregate and/or forward this collected information to the controller 128.

Figure 2:
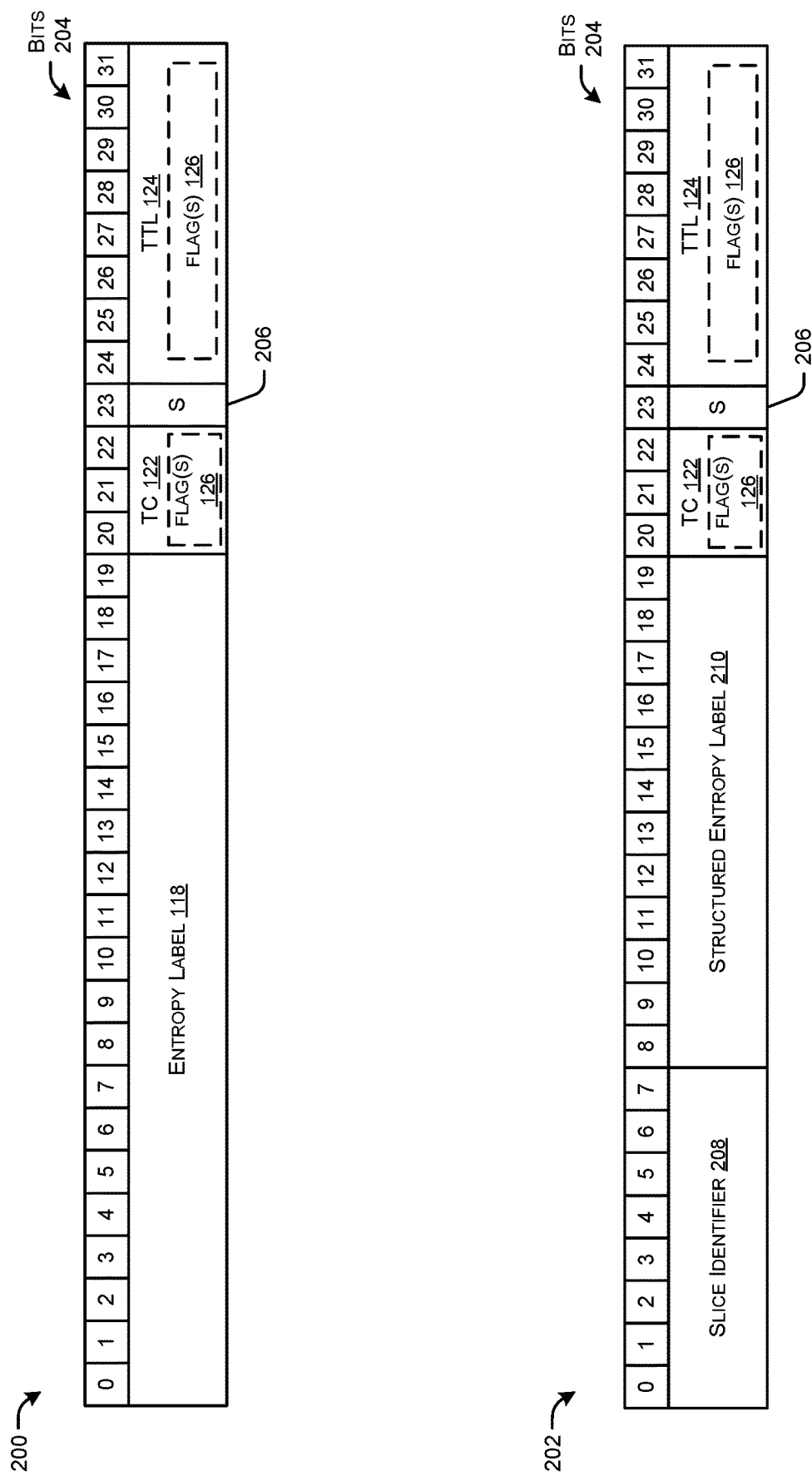
FIG. 2 illustrates example labels of an MPLS label stack that can be used to carry one or more flag(s) associated with a monitoring operation.

FIG. 2 illustrates example labels 200 and 202 of an MPLS label stack that can be used to carry one or more flag(s) 126 associated with a monitoring operation. The example label 200 includes the entropy label 118 (bits 0-19 of the bits 204), the TC field 122 (bits 20-22), an S (End of Label Stack) field 206 (bit 23), and the TTL field 124 (bits 24-31). As illustrated in FIG. 2, the one or more flag(s) 126 may be carried within the TC field 122 or the TTL field 124.

The example label 202 includes a network slice identifier field 208 (bits 0-7), a structured entropy label field 210 (bits 8-19), the TC field (bits 20-22), the S (End of Stack) field 206 (bit 23), and the TTL field 124 (bits 24-31). In examples, the one or more flag(s) 126 may be carried within the TC field 122 or the TTL field 124 of the label 202.

Figure 3B:
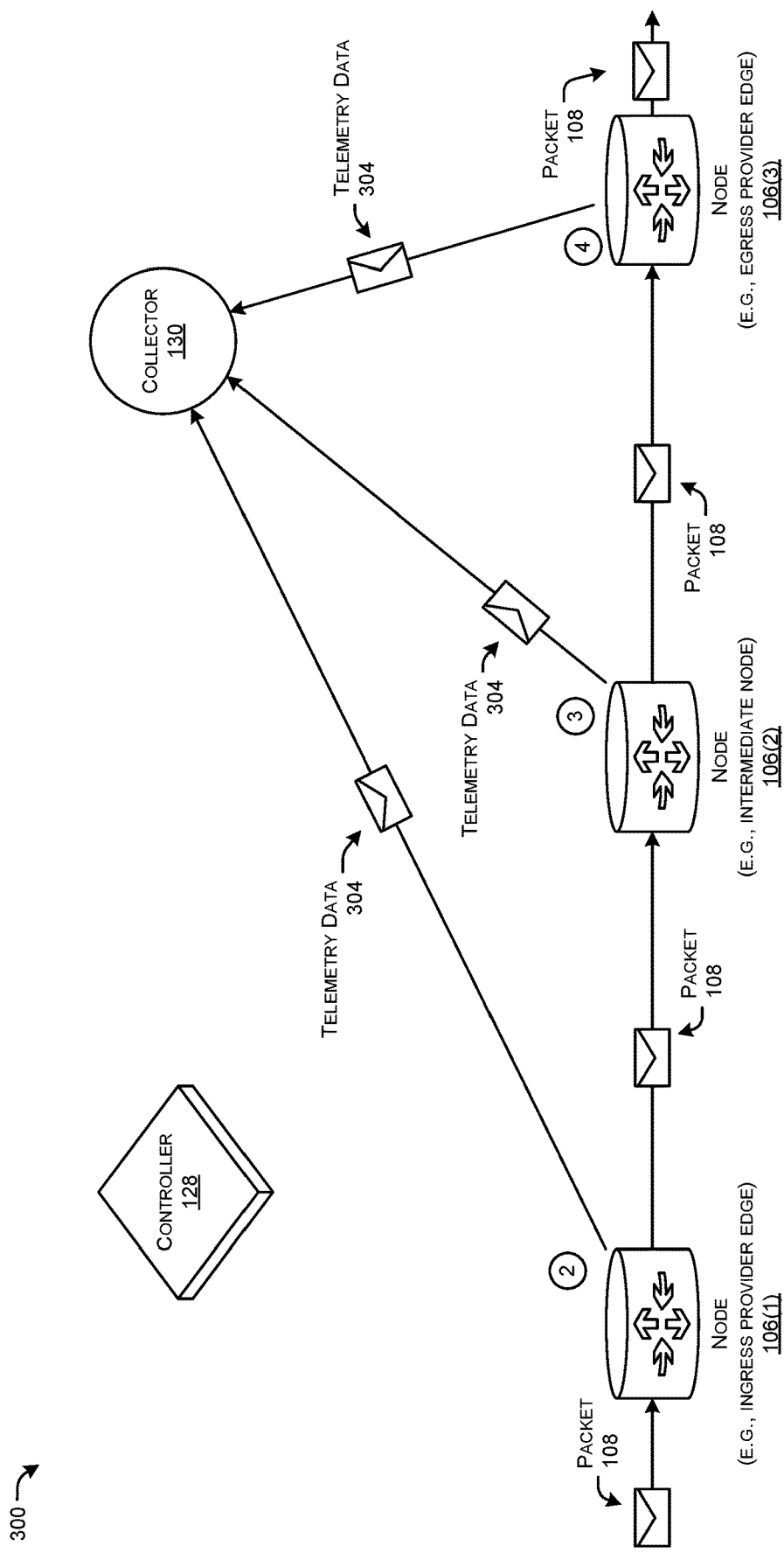

FIGS. 3A and 3B collectively illustrate an example process 300 in which nodes send telemetry data based on a packet including a flag indicating a telemetry operation. At "1," the controller 128 may perform an operation 302, which can include configuring one or more of the nodes 106 to perform in-band telemetry for a traffic flow. For instance, the controller 128 may send an indication to the nodes 106 of an entropy value identifying the path (e.g., flow) for which the telemetry data 304 is to be collected. In some examples, the controller 128 may provision a location of the bit flag for the nodes 106 (e.g., the location within the MPLS header where the bit flag is to be located, such as the TTL field of the entropy label, TC field of the entropy label, and the bit positions of the flags in these fields, or the like).

At "2," the node 106(1) receives the packet 108 and sends telemetry data 304 to the collector 130. In some examples, node 106(1) may, based on being configured by the controller 128, encapsulate the packet 108 with an MPLS header and include a flag in the entropy label of the MPLS label stack. The flag may indicate that a telemetry operation is to be performed by one or more of the downstream nodes 106. In some examples, the node 106(1) may generate a copy of the packet 108 and the telemetry data 304 may include the copy of the packet 108. In some examples, the copy of the packet 108 may first be punted to a slow path for this purpose, and the node 106(1) may forward a copy of the packet 108 downstream in the fast path. In some examples, the node 106(1) may set the telemetry flag at set intervals, such as once every 1 million packets, once every 30 seconds, or the like.

At "3," the node 106(2) receives the packet 108, makes a determination that the packet 108 includes a flag in the entropy label of the label stack of the MPLS header of the packet 108, and sends telemetry data 304 to the collector 130. In some examples, the node 106(2) may generate a copy of the packet 108 and the telemetry data 304 may include the copy of the packet 108. In some examples, the copy of the packet 108 may first be punted to a slow path for being sent to the collector 130, and the node 106(2) may forward a copy of the packet 108 downstream in the fast path. In some examples, it may be important that the node 106(2) does not remove the ELI and EL from the MPLS header, as it may be necessary for the node 106(3) to receive the ELI and EL in the MPLS header to allow the collection of samples of data along the path of the traffic flow.

At "4," the node 106(3) receives the packet 108, makes a determination that the packet 108 includes the flag in the entropy label of the label stack of the MPLS header of the packet 108, and sends telemetry data 304 to the collector 130. The node 106(3) may then forward the packet 108 downstream towards its destination. In some examples, the node 106(3) may generate a copy of the packet 108 and the telemetry data 304 may include the copy of the packet 108. In some examples, the copy of the packet 108 may first be punted to a slow path for being sent to the collector 130, and the node 106(3) may forward a copy of the packet 108 downstream in the fast path. Additionally, in some examples the node 106(3) (e.g., egress decapsulating node) may remove the MPLS encapsulation before sending the packet 108 to its destination.

Figure 4:
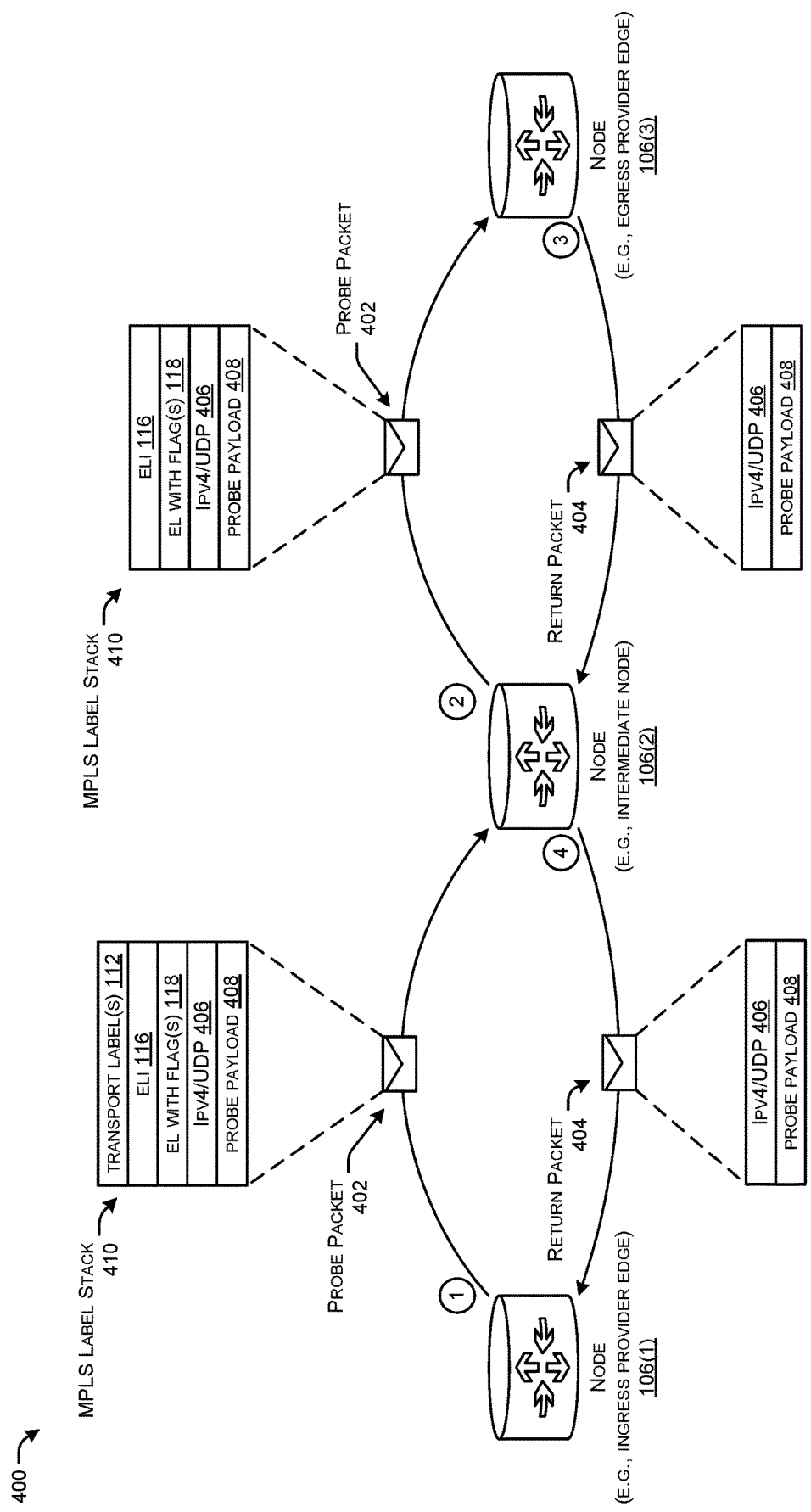
FIG. 4 illustrates an example process in which a probe message is sent that includes one or more flag(s) in an entropy label of an MPLS label stack.

FIG. 4 illustrates an example process 400 in which a probe packet 402 is sent that includes one or more flag(s) in an entropy label 118 of an MPLS label stack 410. In some examples, the probe packet 402 may comprise a PM probe packet.

At "1," the node 106(1) may send the probe packet 402 to the node 106(2). The probe packet 402 may include an MPLS label stack 410 that includes one or more transport label(s) 112, an ELI 116, an EL 118 with flag(s) 126, an IPv4/UDP label 406, and a probe payload 408. In some examples, the EL 118 with the flag(s) 126 may indicate that a probe message is being sent and/or that the node 106(3) is to insert an RX timestamp into the probe payload 408 upon receipt. In some examples, the probe payload 408 may include a TX timestamp indicating a time at which the node 106(1) sent the probe packet 402. The IPv4/UDP label 406 may indicate that the node 106(3) is the source and that the node 106(1) is the destination for the return packet 404.

At "2," the node 106(2) may receive the probe packet 402 and forward the probe packet to the node 106(3). In some examples, the node 106(2) may be configured to refrain from removing the ELI 116 and the EL 126 with the flag(s) 118 from the MPLS label stack 410 of the probe packet 402.

At "3," the node 106(3) may receive the probe packet 402. Based on the EL 118 with flag(s) 126 indicating that the node 106(3) is to respond with an RX timestamp, the node 106(3) may generate the return packet 404 and send it to the node 106(2). In some examples, the IPv4/UDP label 406 may indicate that the node 106(3) is the source and that the node 106(1) is the destination, and the probe payload 408 may include the TX timestamp when the node 106(1) sent the probe packet 402 and the RX timestamp at which the node 106(3) received the probe packet 402.

At "4," the node 106(2) may receive the return packet 404 and forward the return packet 404 to the node 106(1). Once the node 106(1) receives the return packet, the node 106(1) may compute a latency associated with sending the probe packet 402 to the node 106(3) by computing a difference between the RX timestamp and the TX timestamp.

Figure 5:
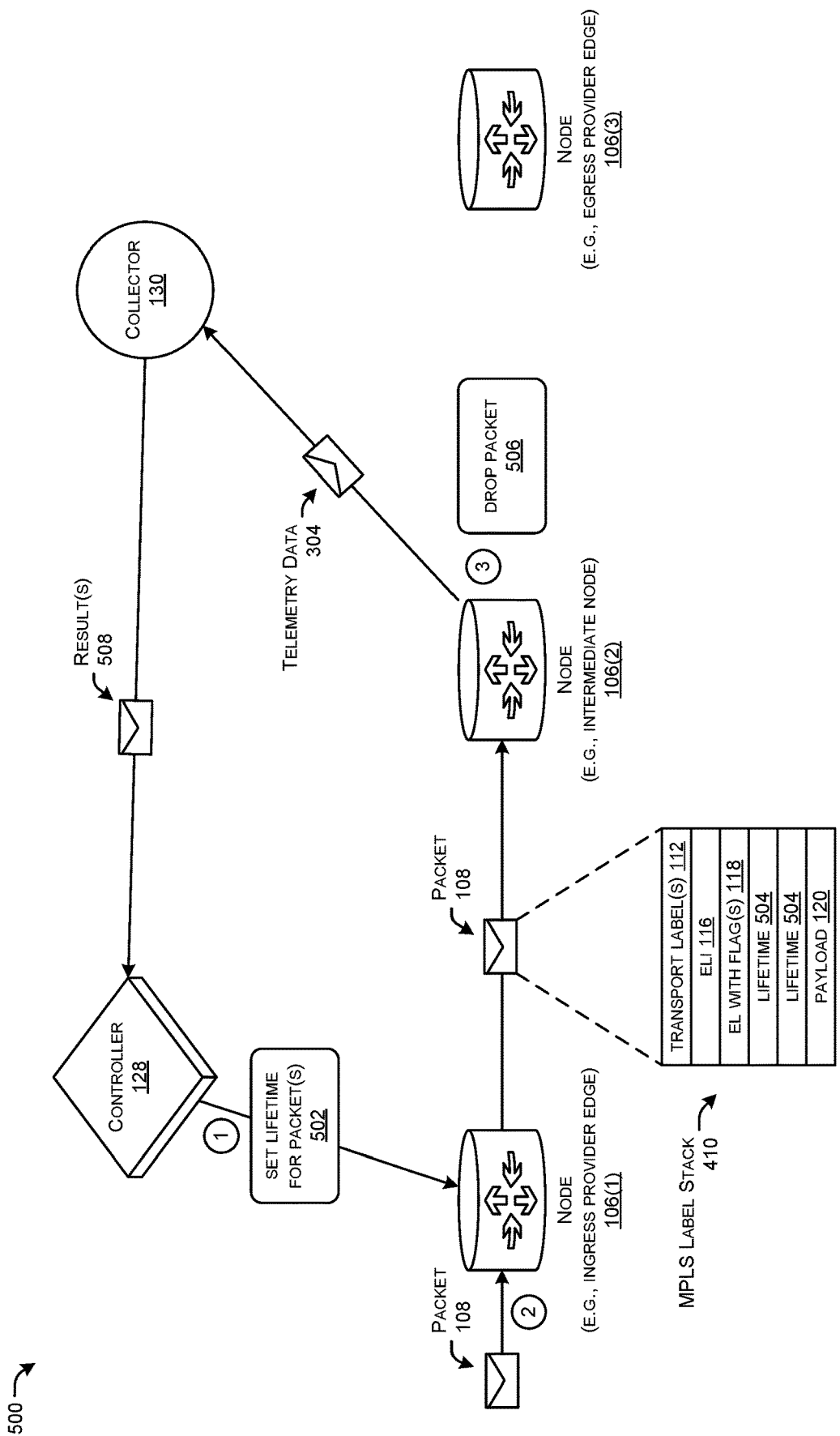
FIG. 5 illustrates an example process in which a node drops a time sensitive network packet based at least in part on a flag included in the entropy label.

FIG. 5 illustrates an example process 500 in which a node 106(2) drops a time sensitive network packet 108 based at least in part on a flag included in the entropy label. For instance, the node 106(2) may determine that a lifetime of the packet 108 has expired and drop the packet 108.

At "1," the controller 128 may perform an action 502, which includes setting lifetimes for packet(s). For instance, the controller 128 may set the lifetime for packets associated with a certain data flow, a certain customer, a certain traffic class (e.g., video, audio, web traffic, etc.). In some examples, the controller 128 may send an indication of the lifetime for packets to the node 106(1) (e.g., an ingress or encapsulation node).

At "2," the node 106(1) may receive the packet 108, encapsulate the packet 108 with an MPLS header that includes the MPLS label stack 410, and send the packet 108 towards its destination by forwarding the packet 108 to the node 106(2). In some examples, the MPLS label stack 410 of the packet 108 may include one or more transport label(s) 112, an entropy label indicator (ELI) 116, an entropy label (EL) 118 including one or more flag(s), one or more lifetime labels 504 (e.g., deadline timestamps), and a payload 120.

At "3," the node 106(2) may receive the packet 108 and determine that the packet includes the flag(s) in the entropy label 118. The node 106(2) may make a determination that the entropy label 118 flag(s) include a TSN flag, and then determine whether the lifetime of the packet 108 has expired. In this case, the node 106(2) determines that the lifetime has expired and performs operation 506, which includes dropping the packet 108 instead of forwarding the packet 108 to the node 106(3). Additionally, in some examples, the node 106(2) may send telemetry data 304 to the collector 130 based at least in part on dropping the packet 108. The collector 130 may analyze the telemetry data and forward results 508 to the controller 128. In some examples, the results 508 may be used by the controller 128 to determine a different path through the network to send the packet 108 to meet a service level agreement.

FIG. 6 illustrates example MPLS label stacks 600, 602, 604, and 606 that can be used for performing various monitoring operations. In some examples, the label stack 600 may be used for performing TSN-related operations, the label stack 602 may be used for performing IOAM operations, and the label stacks 604 and 606 may be used for performing latency measurements (e.g., using probe messages).

The label stack 600 may include the one or more transport label(s) 112, the one or more accounting label(s) 114, the entropy label indicator 116, a timestamp-location (TS-LOC) field 608, a structured entropy label 118, one or more lifetimes 504 (e.g., deadline timestamps for TSN), and the payload 120. Additionally, each label of the label stack 600 may include a corresponding traffic class field 122 and time to live field 124. In some examples, the traffic class fields 122 and/or the time to live fields 124 corresponding with the structured entropy label 118 and the lifetimes 504 may be utilized to carry other data. For instance, the traffic class fields 122 and/or the time to live fields 124 corresponding with the structured entropy label 118 may be used to carry one or more flag(s) 126. In the label stack 600, the one or more flag(s) 126 may indicate that the packet includes a TSN lifetime 504. Additionally, the traffic class fields 122 and/or the time to live fields 124 corresponding with the lifetimes 504 may include data indicating a timestamp format 610 of the timestamp in the lifetime 504. In some examples, the timestamp-location field 608 may indicate a location in the label stack 600 of the lifetime 504 (e.g., before the payload 120 or after the payload 120).

The label stack 602 used for performing IOAM operations may include the one or more transport label(s) 112, the one or more accounting label(s) 114, the entropy label indicator 116, the structured entropy label 118, a VPN label 612, one or more IOAM data field(s) 614, and the payload 120. Additionally, each label of the label stack 602 may include a corresponding traffic class field 122 and time to live field 124. In some examples, the traffic class fields 122 and/or the time to live fields 124 corresponding with the structured entropy label 118 may be utilized to carry one or more flag(s) 126. In the label stack 602, the one or more flag(s) 126 may indicate the presence of the IOAM data and the IOAM data field(s) 614 in the packet. In some examples, a first flag 126 that may be used may indicate hop-by-hop IOAM processing and a second flag 126 that may be used may indicated edge-to-edge IOAM processing.

The label stacks 604 and 606 used for performing latency measurements may include the one or more transport label(s) 112, the one or more accounting label(s) 114, the entropy label indicator 116, the timestamp-location (TS-LOC) field 608, the structured entropy label 118, the network slice identifier field (SLID) 208, the payload 120, and a timestamp(s) field 616. Additionally, each label of the label stack 600 may include a corresponding traffic class field 122 and time to live field 124. In some examples, the traffic class fields 122 and/or the time to live fields 124 corresponding with the structured entropy label 118 may be utilized to carry one or more flag(s) 126. In the label stacks 604 and 606, the one or more flag(s) 126 may indicate that a downstream node is to insert its RX timestamp in the timestamp(s) field 616. In some examples, the timestamp-location field 608 may be located in the same layer of the label stack as the structured entropy label 118 and, in other examples, the timestamp-location field 608 may be located in a layer below the structured entropy label 118. The timestamp-location field 608 may indicate a location in the label stacks 604 and 606 of the timestamp(s) field 616 and/or a timestamp format that is to be inserted by the downstream node.

FIG. 7 is a flow diagram illustrating an example method 700 associated with carrying indicator flags within an entropy label of an MPLS label stack. The logical operations described herein with respect to FIG. 7 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 700 begins at operation 702, which includes determining, by a first node of a network, to perform a monitoring operation associated with traffic that is sent along a path between the first node and a second node of the network. For instance, the node 106(1) may determine to perform the monitoring operation for traffic that is sent to either one of the node 106(2) or the node 106(3). In some examples, the network may be an MPLS network, SR network, EVPN network, or another type of network. In some examples, the first node may be an ingress provider edge node (e.g., an SR-MPLS traffic engineering Policy node, or MPLS encapsulating node) of the network, the second node may be an egress provider edge node (e.g. MPLS decapsulating node) of the network, and the path between the ingress provider edge node and the egress provider edge node may include one or more additional nodes (e.g., intermediate or midpoint nodes) of the network. In other examples, the first node and/or the second node may be any node of the network that is capable of adding or removing encapsulation to a packet, such as an edge node, intermediate node, or the like.

At operation 704, the method 700 includes receiving, at the first node, a packet that is to be sent along the path to the second node. For instance, the node 106(1) may receive the packet 108 that is to be sent to either one of the node 106(2) or the node 106(3).

At operation 706, the method 700 includes encapsulating, by the first node, the packet with a Multiprotocol Label Switching (MPLS) header that includes an entropy label, the entropy label including a flag indicating the monitoring operation to be performed. For instance, the node 106(1) may encapsulate the packet 108 based at least in part on determining to perform the monitoring operation. In some examples, the monitoring operation may comprise, or be associated with, a packet loss measurement, a telemetry operation, an OAM operation, a determination of a latency between the first node and the second node, a determination of whether a TSN lifetime has expired, an IOAM operation, or the like. Additionally, in some examples, the flag may be included in at least one of a TTL field, traffic class field, entropy label control field, or other field of the entropy label or entropy label indicator or some other label of the MPLS header (e.g., MPLS stack).

At operation 708, the method 700 includes sending, by the first node, the packet including the MPLS header along the path to the second node. For instance, the node 106(1) may send the packet 108 to the nodes 106(2) and/or 106(3). Based at least in part on including the flag in the entropy label of the MPLS header, the MPLS stack is not altered and the packet may be sent along the path to the second node instead of being sent along a different path that is not usually traversed by the packet. In some examples, a controller associated with the network may configure one or more nodes of the network, such as the first node and the second node, to perform the monitoring operations.

Figure 8:
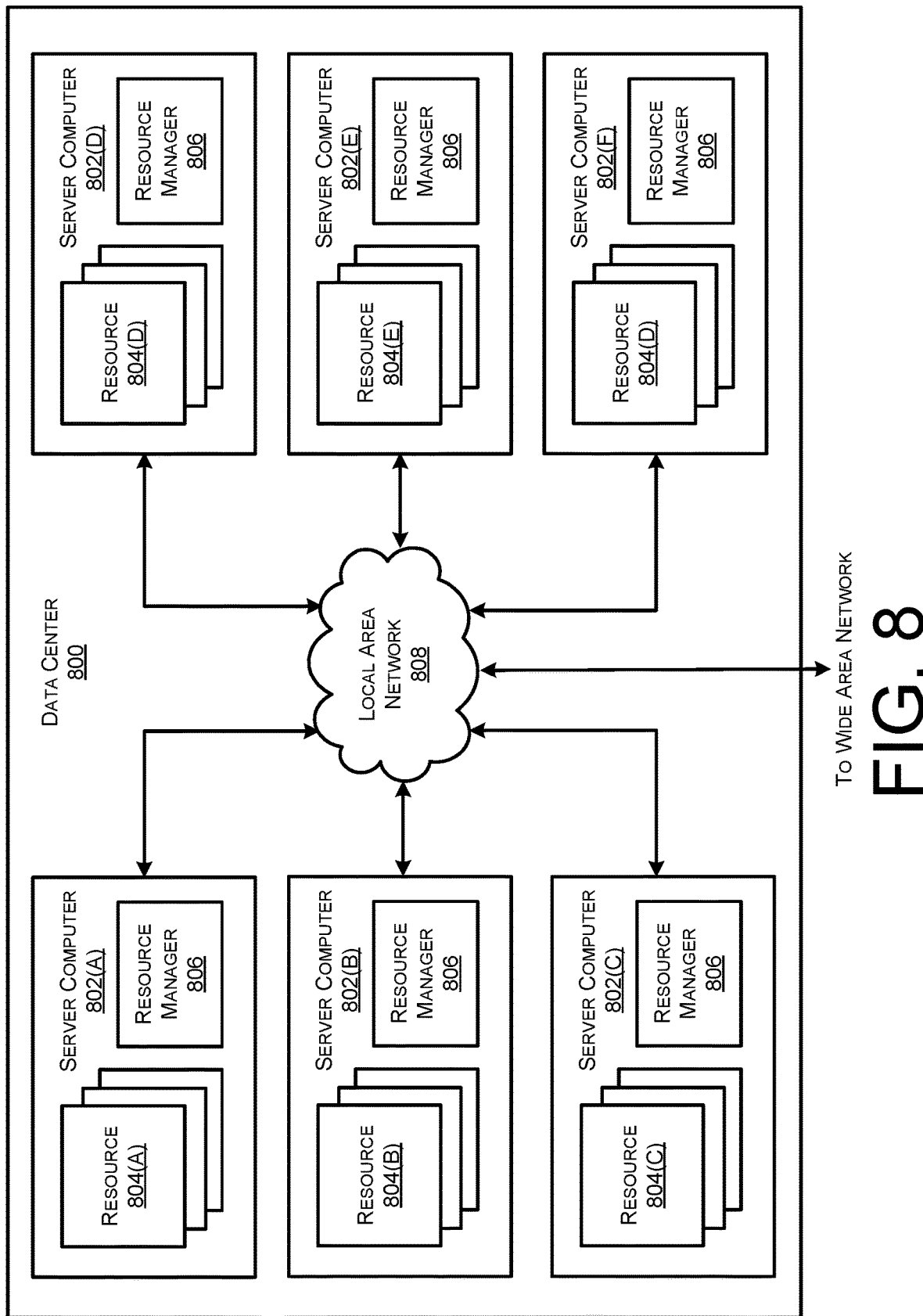
FIG. 8 is a computing system diagram illustrating an example configuration of a data center that can be utilized to implement aspects of the technologies disclosed herein.

FIG. 8 is a computing system diagram illustrating an example configuration of a data center 800 that can be utilized to implement aspects of the technologies disclosed herein. The example data center 800 shown in FIG. 8 includes several server computers 802A-802F (which might be referred to herein singularly as "a server computer 802" or in the plural as "the server computers 802") for providing computing resources. In some examples, the resources and/ or server computers 802 may include, or correspond to, any type of networked device or node described herein. Although described as servers, the server computers 802 may comprise any type of networked device, such as servers, switches, routers, hubs, bridges, gateways, modems, repeaters, access points, etc.

The server computers 802 can be standard tower, rack-mount, or blade server computers configured appropriately for providing computing resources. In some examples, the server computers 802 may provide computing resources 804 including data processing resources such as VM instances or hardware computing systems, database clusters, computing clusters, storage clusters, data storage resources, database resources, networking resources, security, packet inspection, and others. Some of the servers 802 can also be configured to execute a resource manager 806 capable of instantiating and/or managing the computing resources. In the case of VM instances, for example, the resource manager 806 can be a hypervisor or another type of program configured to enable the execution of multiple VM instances on a single server computer 802. Server computers 802 in the data center 800 can also be configured to provide network services and other types of services.

In the example data center 800 shown in FIG. 8, an appropriate local area network (LAN) 808 is also utilized to interconnect the server computers 802A-802F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 800, between each of the server computers 802A-802F in each data center 800, and, potentially, between computing resources in each of the server computers 802. It should be appreciated that the configuration of the data center 800 described with reference to FIG. 8 is merely illustrative and that other implementations can be utilized.

In some examples, the server computers 802 may each execute one or more application containers and/or virtual machines to perform techniques described herein. In some instances, the data center 800 may provide computing resources, like application containers, VM instances, and storage, on a permanent or an as-needed basis. Among other types of functionality, the computing resources provided by a cloud computing network may be utilized to implement the various services and techniques described above. The computing resources 804 provided by the cloud computing network can include various types of computing resources, such as data processing resources like application containers and VM instances, data storage resources, networking resources, data communication resources, network services, and the like.

Each type of computing resource 804 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 804 not mentioned specifically herein.

The computing resources 804 provided by a cloud computing network may be enabled in one embodiment by one or more data centers 800 (which might be referred to herein singularly as "a data center 800" or in the plural as "the data centers 800"). The data centers 800 are facilities utilized to house and operate computer systems and associated components. The data centers 800 typically include redundant and backup power, communications, cooling, and security systems. The data centers 800 can also be located in geographically disparate locations. One illustrative embodiment for a data center 800 that can be utilized to implement the technologies disclosed herein will be described below with regard to FIG. 9.

Figure 9:
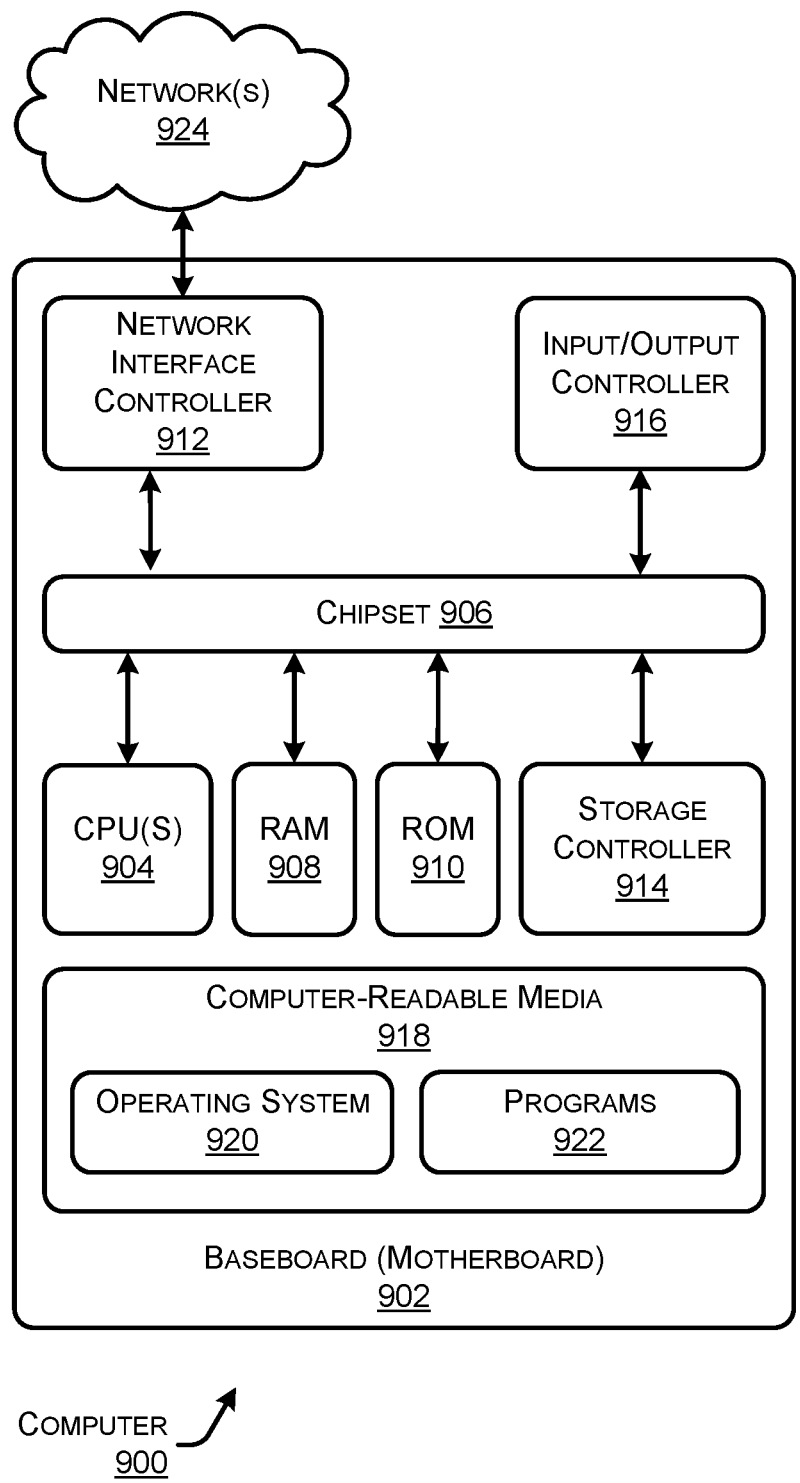
FIG. 9 is a computer architecture diagram showing an illustrative computer hardware architecture for implementing a computing device that can be utilized to implement aspects of the various technologies presented herein.

FIG. 9 is a computer architecture diagram showing an illustrative computer hardware architecture for implementing a computing device that can be utilized to implement aspects of the various technologies presented herein. The computer architecture shown in FIG. 9 illustrates a conventional server computer, network node, router, workstation, desktop computer, laptop, tablet, network appliance, e-reader, smartphone, or other computing device, and can be utilized to execute any of the software components presented herein.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 102. The chipset 906 can include functionality for providing network connectivity through a NIC 912, such as a gigabit Ethernet adapter. The NIC 912 is capable of connecting the computer 900 to other computing devices over the network 924 and/or network 102. It should be appreciated that multiple NICs 912 can be present in the computer 900, connecting the computer to other types of networks and remote computer systems. In some examples, the NIC 912 may be configured to perform at least some of the techniques described herein.

The computer 900 can be connected to a storage device 918 that provides non-volatile storage for the computer. The storage device 918 can store an operating system 920, programs 922, and data, which have been described in greater detail herein. The storage device 918 can be connected to the computer 900 through a storage controller 914 connected to the chipset 906. The storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 918 is characterized as primary or secondary storage, and the like.

For example, the computer 900 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the storage device 918 by detecting the physical states or characteristics of one or more particular locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900. In some examples, the operations performed by the architecture 100 and or any components included therein, may be supported by one or more devices similar to computer 900. Stated otherwise, some or all of the operations performed by the architecture 100, and or any components included therein, may be performed by one or more computer devices 900 operating in a scalable arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD- ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 918 can store an operating system 920 utilized to control the operation of the computer 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 918 can store other system or application programs and data utilized by the computer 900.

In one embodiment, the storage device 918 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various processes and functionality described above with regard to FIGS. 1-8, and herein. The computer 900 can also include computer-readable storage media having instructions stored thereupon for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or might utilize an architecture completely different than that shown in FIG. 9.

The computer 900 may include one or more hardware processors (processors) configured to execute one or more stored instructions. The processor(s) may comprise one or more cores. Further, the computer 900 may include one or more network interfaces configured to provide communications between the computer 900 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 922 may comprise any type of programs or processes to perform the techniques described in this disclosure for policy-based failure handling that leverages the sensitivity and criticality of the data that is received for processing by different edge services. For instance, the programs 922 may be eBPF programs to detect errors associated with edge services, a FaaS (Function as a Service) that may be invoked to perform edge service processing, cloud-based applications hosted on the cloud, and the like.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving a packet that is to be sent along an equal-cost multipath (ECMP) route;
encapsulating the packet with a Multiprotocol Label Switching (MPLS) header that includes a special purpose label;
based at least in part on a determination that a monitoring operation is to be performed, altering the special purpose label of the MPLS header to include an indication of the monitoring operation to be performed; and
sending the packet including the MPLS header along the ECMP route.

2. The method of claim 1, wherein the special purpose label included in the MPLS header is an entropy label.

3. The method of claim 1, wherein altering the special purpose label of the MPLS header comprises altering the special purpose label to include a bit flag indicating the monitoring operation that is to be performed.

4. The method of claim 1, wherein the indication of the monitoring operation to be performed is included in at least one of a Time to Live (TTL) field or a Traffic Class (TC) field of the special purpose label of the MPLS header.

5. The method of claim 1, wherein:
the monitoring operation is a packet loss measurement associated with traffic sent along the ECMP route, and
a bit included in the special purpose label indicates a first coloring associated with the packet, the first coloring distinguishable from a second coloring associated with another packet that is to be sent along the ECMP route.

6. The method of claim 1, wherein the monitoring operation comprises determining an end-to-end latency associated with sending the packet along the ECMP route.

7. The method of claim 1, wherein the indication of the monitoring operation is a bit flag included in the special purpose label, the bit flag set to indicate a specific monitoring operation.

8. A system comprising:
one or more processors; and
one or more non-transitory computer-readable media storing instructions that, when executed, cause the one or more processors to perform operations comprising:
receiving a packet that is to be sent along an equal-cost multipath (ECMP) route;
encapsulating the packet with a Multiprotocol Label Switching (MPLS) header that includes a special purpose label;
based at least in part on a determination that a monitoring operation is to be performed, altering the special purpose label of the MPLS header to include an indication of the monitoring operation to be performed; and sending the packet including the MPLS header along the ECMP route.

9. The system of claim 8, wherein the special purpose label included in the MPLS header is an entropy label.

10. The system of claim 8, wherein altering the special purpose label of the MPLS header comprises altering the special purpose label to include a bit flag indicating the monitoring operation that is to be performed.

11. The system of claim 8, wherein the indication of the monitoring operation to be performed is included in at least one of a Time to Live (TTL) field or a Traffic Class (TC) field of the special purpose label of the MPLS header.

12. The system of claim 8, wherein:
the monitoring operation is a packet loss measurement associated with traffic sent along the ECMP route, and
a bit included in the special purpose label indicates a first coloring associated with the packet, the first coloring distinguishable from a second coloring associated with another packet that is to be sent along the ECMP route.

13. The system of claim 8, wherein the monitoring operation comprises determining an end-to-end latency associated with sending the packet along the ECMP route.

14. The system of claim 8, wherein the indication of the monitoring operation is a bit flag included in the special purpose label, the bit flag set to indicate a specific monitoring operation.

15. One or more non-transitory computer-readable media storing instructions that, when executed, cause one or more computing devices to perform operations comprising:
receiving a packet that is to be sent along an equal-cost multipath (ECMP) route;
encapsulating the packet with a Multiprotocol Label Switching (MPLS) header that includes a special purpose label;
based at least in part on a determination that a monitoring operation is to be performed, altering the special purpose label of the MPLS header to include an indication of the monitoring operation to be performed; and
sending the packet including the MPLS header along the ECMP route.

16. The one or more non-transitory computer-readable media of claim 15, wherein the special purpose label included in the MPLS header is an entropy label.

17. The one or more non-transitory computer-readable media of claim 15, wherein altering the special purpose label of the MPLS header comprises altering the special purpose label to include a bit flag indicating the monitoring operation that is to be performed.

18. The one or more non-transitory computer-readable media of claim 15, wherein the indication of the monitoring operation to be performed is included in at least one of a Time to Live (TTL) field or a Traffic Class (TC) field of the special purpose label of the MPLS header.

19. The one or more non-transitory computer-readable media of claim 15, wherein:
the monitoring operation is a packet loss measurement associated with traffic sent along the ECMP route, and
a bit included in the special purpose label indicates a first coloring associated with the packet, the first coloring distinguishable from a second coloring associated with another packet that is to be sent along the ECMP route.

20. The one or more non-transitory computer-readable media of claim 15, wherein the monitoring operation comprises determining an end-to-end latency associated with sending the packet along the ECMP route.

* * * * *